(12) United States Patent
Shimizu

(10) Patent No.: US 8,413,258 B2
(45) Date of Patent: Apr. 2, 2013

(54) OPTICAL INFORMATION RECORDING MEDIUM, INFORMATION RECORDING METHOD FOR OPTICAL INFORMATION RECORDING MEDIUM AND OPTICAL INFORMATION RECORDING DEVICE

(75) Inventor: Atsuo Shimizu, Takasaki (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 329 days.

(21) Appl. No.: 12/744,763

(22) PCT Filed: Oct. 29, 2008

(86) PCT No.: PCT/JP2008/070148
§ 371 (c)(1),
(2), (4) Date: May 26, 2010

(87) PCT Pub. No.: WO2009/069441
PCT Pub. Date: Jun. 4, 2009

(65) Prior Publication Data
US 2010/0302924 A1   Dec. 2, 2010

(30) Foreign Application Priority Data
Nov. 26, 2007   (JP) .................. 2007-305133

(51) Int. Cl.
*G06F 12/14*   (2006.01)
*G11B 27/36*   (2006.01)
*G11B 11/00*   (2006.01)

(52) U.S. Cl. .................. 726/27; 705/57; 369/53.21

(58) Field of Classification Search .................. None
See application file for complete search history.

(56) References Cited

U.S. PATENT DOCUMENTS
5,703,859 A * 12/1997 Tahara et al. .................. 369/84
(Continued)

FOREIGN PATENT DOCUMENTS
CN   1416115 A   5/2003
CN   1977249 A   6/2007
(Continued)

OTHER PUBLICATIONS
Ishihara, "Content Protection on DVD", Toshiba Review, 2003, vol. 58, No. 6, pp. 28-31.
(Continued)

*Primary Examiner* — Christopher Revak
(74) *Attorney, Agent, or Firm* — Law Office of Katsuhiro Arai

(57) ABSTRACT

This object aims to propose an optical information recording medium configured to make copyright protection possible, an information recording method for an optical information recording medium and a recording device. An optical information recording medium is proposed to have a recording area available for recording data by laser light, wherein the recording area is provided with a user data area and a management area. The management area written in the optical information recording medium includes a recording format management area provided with information for carrying out operations that identify a format recorded in the user data area, convert the format into a predetermined signal system in accordance with an identified result and record the converted format; a recording condition management area provided with information to make the control of recording conditions of the laser light feasible when the data are recorded at the user recording area; and an authentication identification area provided with information for carrying out an operation that identifies whether or not the optical information recording medium is authenticated by a third party.

19 Claims, 2 Drawing Sheets

U.S. PATENT DOCUMENTS

| | | | |
|---|---|---|---|
| 6,052,465 A * | 4/2000 | Gotoh et al. | 369/53.21 |
| 6,122,373 A * | 9/2000 | Gotoh et al. | 705/52 |
| 6,141,419 A * | 10/2000 | Gotoh et al. | 705/52 |
| 6,160,888 A * | 12/2000 | Gotoh et al. | 380/203 |
| 6,175,629 B1 * | 1/2001 | Gotoh et al. | 380/203 |
| 6,208,736 B1 * | 3/2001 | Gotoh et al. | 380/203 |
| 6,229,896 B1 * | 5/2001 | Gotoh et al. | 380/203 |
| 6,285,762 B1 * | 9/2001 | Gotoh et al. | 380/203 |
| 6,285,763 B1 * | 9/2001 | Gotoh et al. | 380/203 |
| 6,457,128 B1 * | 9/2002 | Gotoh et al. | 713/193 |
| 6,470,452 B1 * | 10/2002 | Gotoh et al. | 713/193 |
| 6,480,960 B1 * | 11/2002 | Gotoh et al. | 713/193 |
| 6,580,683 B1 * | 6/2003 | Braitberg et al. | 369/275.3 |
| 6,633,535 B1 * | 10/2003 | Asada | 369/286 |
| 6,646,967 B1 * | 11/2003 | Garcia | 369/53.21 |
| 6,728,882 B2 * | 4/2004 | Gotoh et al. | 713/193 |
| 6,757,391 B2 * | 6/2004 | Gotoh et al. | 380/201 |
| 6,862,685 B2 * | 3/2005 | Gotch et al. | 713/193 |
| 6,888,783 B2 | 5/2005 | Maegawa | |
| 7,003,674 B1 * | 2/2006 | Hamlin | 713/193 |
| 7,046,615 B2 | 5/2006 | Maegawa | |
| 7,103,781 B2 * | 9/2006 | Gotoh et al. | 713/193 |
| 7,110,544 B2 * | 9/2006 | Gotoh et al. | 380/203 |
| 7,193,959 B2 * | 3/2007 | Lee et al. | 369/275.3 |
| 7,216,228 B2 * | 5/2007 | Sako et al. | 713/168 |
| 7,263,056 B2 * | 8/2007 | Allen | 369/275.2 |
| 7,411,881 B2 | 8/2008 | Suzuki | |
| 2002/0136126 A1 | 9/2002 | Maegawa | |
| 2003/0086345 A1 | 5/2003 | Ueki | |
| 2004/0013063 A1 | 1/2004 | Maegawa | |
| 2004/0190389 A1 * | 9/2004 | Nakano et al. | 369/30.03 |
| 2004/0233832 A1 * | 11/2004 | Sako et al. | 369/275.3 |
| 2005/0013226 A1 | 1/2005 | Suzuki | |
| 2005/0036427 A1 * | 2/2005 | Suh | 369/94 |
| 2005/0094516 A1 * | 5/2005 | Morimoto et al. | 369/47.28 |
| 2005/0286379 A1 * | 12/2005 | Kazami et al. | 369/53.21 |
| 2006/0077815 A1 * | 4/2006 | Komoda | 369/47.1 |
| 2006/0153017 A1 * | 7/2006 | Kim | 369/30.01 |
| 2006/0176791 A1 | 8/2006 | Ueki | |
| 2006/0221786 A1 * | 10/2006 | Komoda et al. | 369/47.1 |
| 2006/0274612 A1 * | 12/2006 | Kim | 369/30.04 |
| 2007/0247985 A1 * | 10/2007 | Ueda et al. | 369/47.1 |
| 2008/0069354 A1 | 3/2008 | Kitani | |

FOREIGN PATENT DOCUMENTS

| | | |
|---|---|---|
| JP | H08-249662 A | 9/1996 |
| JP | 2001-110062 A | 4/2001 |
| JP | 2002-157740 A | 5/2002 |
| JP | 2002-279640 A | 9/2002 |
| JP | 2004-362631 A | 12/2004 |
| JP | 2006-031818 A | 2/2006 |
| TW | 200741672 A | 11/2007 |
| WO | 2007/049745 A | 5/2007 |

OTHER PUBLICATIONS

"Content Protection for Recordable Media Specification DVD Book", Intel Corp. et al., Revision 0.96, Jan. 31, 2003.
Advanced Access Content System (AACS) HD DVD Recordable Book, Intel Corp. et al., Revision 0.921, Jul. 25, 2006.
Advanced Access Content System (AACS) HD DVD Recordable Book, Intel Corp. et al., Revision 0.93 Aug. 14, 2007.
Advanced Access Content System (AACS) Introduction and Common Cryptographic Elements, Intel Corp. et al., Revision 0.91, Feb. 17, 2006.
Maeda et al., "Physical Format of the Blu-ray Disc", Sharp-Giho, vol. 90, pp. 11-15, Dec. 2004.
"Standard ECMA-359", 1st Edition/ Dec. 2004 :80mm (1.46Gbytes per side) and 120mm (4.70 Gbytes per side) DVD Recordable Disk (DVD-R)).
Notice of Examination Opinions with Search Report issued by Taiwanese Intellectual Property Office, dated Sep. 18, 2012, for Taiwanese counterpart application No. 097141440.

* cited by examiner

RECORDING AREA

OPTICAL INFORMATION RECORDING MEDIUM, INFORMATION RECORDING METHOD FOR OPTICAL INFORMATION RECORDING MEDIUM AND OPTICAL INFORMATION RECORDING DEVICE

This application is the U.S. National Phase under 35 U.S.C. §371 of International Application PCT/JP2008/070148, filed Oct. 29, 2008, which claims priority to Japanese Patent Application No. 2007-305133, filed Nov. 26, 2007. The International Application was published under PCT Article 21(2) in a language other than English.

TECHNICAL FIELD

The present invention relates to an optical information recording medium, such as a write-once type DVD (DVD±R), a write-once type HD DVD (HD DVD-R), or a write-once type BLU-RAY disc (BD-R) and a method of recording information on the optical information recording medium, and more particularly, to an optical information recording medium capable of protecting copyright and a method of recording information on the optical information recording medium.

BACKGROUND ART

Optical information recording media, such as a DVD±R, an HD DVD-R, and a BD-R, have become widespread since it is possible to record or reproduce a large amount of digital data on or from the optical information recording media at a relatively low cost. However, when data can be easily copied, for example, illegal copy discs of music CDs or video files are likely to appear on the market. In addition, in recent years, video or music data has been distributed through a network. Therefore, a means for copyright protection is needed.

As the means for copyright protection, for example, various means, such as a means disclosed in Japanese Patent Laid-open No. 2002-157740 and a means disclosed in Japanese Patent Laid-open No. 2001-110062, have been proposed. In these means, encryption key data or copy protection data is written in a portion of a recording area for copyright protection.

Patent Citation 1: Japanese Patent Laid-open No. 2002-157740
Patent Citation 2: Japanese Patent Laid-open No. 2001-110062

DISCLOSURE OF INVENTION

Problems to be Solved by the Invention

In the related art, when user data requiring copyright protection is recorded, a copyright protection means is used. In general, as described above, the encryption key data or the copy protection data is written in the recording area to manage copyright. However, in the means according to the related art, the quality of a recording medium (for example, an optical disc) is not considered at all. Therefore, data is recorded on a low-quality disc and a high-quality disc in the same way. However, when data is recorded on a low-quality disc, since the recording conditions are not suitable, it may not be possible to record information that should be recorded while the copyright thereof is managed due to a recording error occurring during recording, or, after the information is recorded, the reproduction quality thereof may be reduced. In some cases, signals deteriorate over time and there is a danger that information may not be reproduced.

In addition, an authentication system has been provided in order to stabilize the quality of the disc. However, in this case, the authentication system is operated without being related to a copyright management system. For example, it is technically possible to record user data requiring copyright protection on an unauthorized disc.

When a large amount of important user data that is used for a special purpose and requires strict copyright protection is recorded on an optical information recording medium and is used in a program for performing a special operation, it is necessary to reliably record and reproduce data on and from the optical information recording medium while protecting data and considering the characteristics of the optical information recording medium.

In the invention, a copyright protection system is given as an example. As such, an object of the invention is to provide an optical information recording medium which is capable of appropriately managing user data and on which data can be recorded in consideration of the quality of the optical information recording medium while performing the management of the user data and a system thereof.

Means to Solve the Problems

In the invention, according to a first solving means, there is provided an optical information recording medium including: a user data area in which a user can record user data; and a management area which has information required to control a recording signal when data is recorded in the user data area. In the optical information recording medium in which the user data is recorded by laser light, the management area includes: a recording format management area that has information for allowing an optical information recording device to determine the format of the data recorded in the user data area, convert the format in a predetermined signal form according to the determination result, and record the data; a recording condition management area that has information for controlling the recording conditions of the laser light when data is recorded in the user data area; and an authentication identification area that has information for allowing the optical information recording device to perform an operation of determining whether the optical information recording medium is authenticated by a third party.

According to the first solving means, the format of the optical information recording medium is used as a key to copyright protection. Therefore, even though all of the data written in the recording area is copied, it is possible to prevent the data from being read from other optical information recording media. In addition, since the recording conditions of the optical information recording medium are used as the key, it is possible to perform copyright protection while considering recording quality. The 'user data area' means an area in which information that the user wants to record, for example, music data, image data, and other files are recorded. The 'management area' means a recording area other than the user data area and includes a read-in area, a read-out area, a recording management area that is disposed inside the read-in area, and wobbles or land pre-pits.

These areas are allocated to any one of the management areas. In this case, for example, the recording condition management area and the authentication identification area may be allocated to the same area. In addition, the authentication identification area may be provided in the recording condition management area.

In the invention, according to a second solving means, in the optical information recording medium according to the first solving means, the authentication identification area may have information indicating plural kinds of authentications. According to the second solving means, information items with different formats are included or a plurality of information items is written in each authentication process. Therefore, it is possible to protect copyright.

In the invention, according to a third solving means, in the optical information recording medium according to the first solving means, the information in the authentication identification area may be for allowing the optical information recording device to perform an operation of recording data in the user data area according to the result determined in the authentication identification area with only predetermined software. According to the third solving means, since recording is performed only by dedicated software, it is possible to prevent data from being recorded by a general recording device and thus protect copyright.

In the invention, according to a fourth solving means, in the optical information recording medium according to the first solving means, the information in the recording condition management area may be information indicating a manufacturer and/or information indicating a recording strategy. According to the fourth solving means, it is possible to improve the recording quality of the optical information recording medium while managing the user data.

In the invention, according to a fifth solving means, in the optical information recording medium according to the first solving means, the information for performing the operation which is included in the recording format management area, the information for controlling the recording conditions which is included in the recording condition management area, and the information for performing the determining operation which is included in the authentication identification area may have different formats. Examples of the format are a recording pit (pit arrangement) or a wobble formed by laser light, a land pre-pit, and a bar code. The information in the recording format management area and the information in the recording condition management area are written in different formats. Therefore, even though all of the data written in the recording area is copied, it is possible to prevent the copying of a key to copyright protection. In this case, it is preferable that the information in the recording format management area is provided by the wobbles or the land pre-pits.

In the invention, according to a sixth solving means, in the optical information recording medium according to the first solving means, the conversion to the predetermined signal form managed in the recording format management area may be a conversion to a signal form for copyright protection. According to the sixth solving means, the format of the optical information recording medium is used as a key to copyright protection. Therefore, even though all of the data recorded in the user data area is copied to another optical information recording medium, it is possible to prevent the data from being read from the optical information recording medium.

Advantage of the Invention

According to the invention, it is possible to perform recording while managing user data and considering the quality of an optical information recording medium. Therefore, it is possible to appropriately manage the user data.

DESCRIPTION OF REFERENCE NUMERALS AND SIGNS

Figure 1:
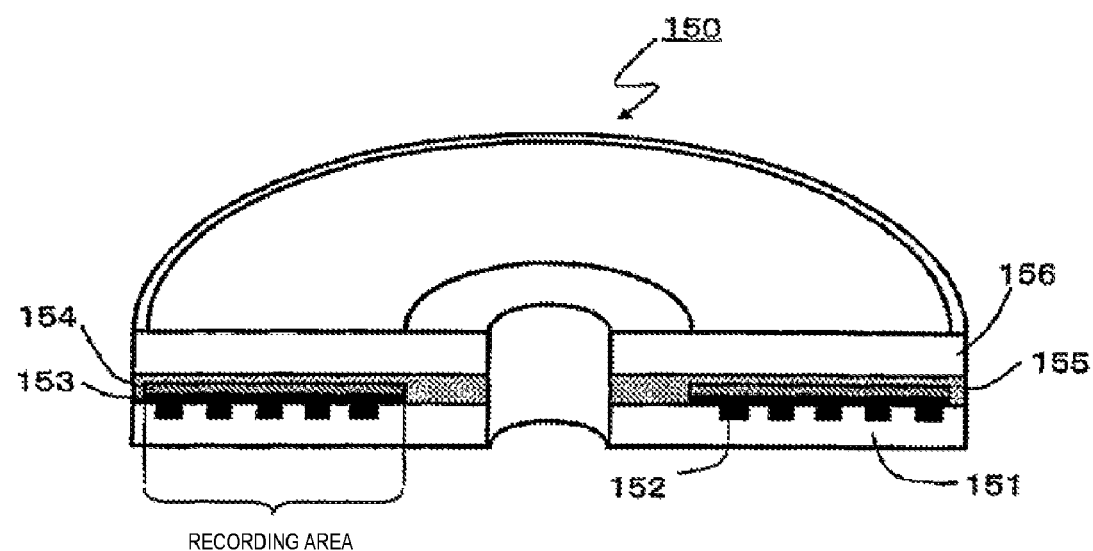
FIG. 1 is a diagram schematically illustrating the structure of a DVD-R.

150: optical disc
151: transparent substrate
152: guide groove
153: recording layer
154: optical reflection layer
155: adhesive layer
156: dummy substrate
160: recording format management area
161: recording condition management area
162: authentication identification area

BEST MODE FOR CARRYING OUT THE INVENTION

Hereinafter, a DVD-R, which is an example of an optical information recording medium according to an embodiment of the invention, will be described. An optical disc 150 shown in FIG. 1 includes a disc-shaped transparent substrate 151, spiral guide grooves 152 that are formed in one surface of the transparent substrate 151, a recording layer 153 that is formed on the surface in which the guide grooves 152 are formed, an optical reflection layer 154 that is formed on the recording layer 153, and a dummy substrate 156 that is adhered to the optical reflection layer 154 through an adhesive layer 155.

Figure 2:
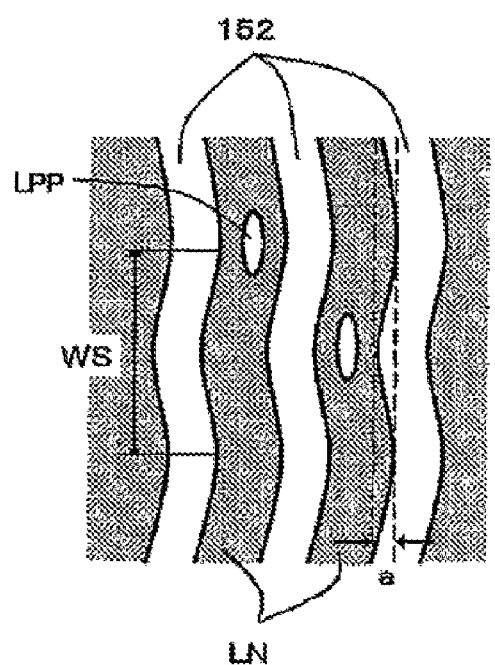
FIG. 2 is a diagram schematically illustrating guide grooves of the DVD-R.

The transparent substrate 151 is a disc-shaped substrate with a diameter of 8 cm or 12 cm and a thickness of 0.6 mm. As shown in FIG. 2, the spiral guide grooves 152 having wobbles are formed in one surface of the transparent substrate 151, and a land LN is provided between adjacent guide grooves 152. The guide grooves 152 and the lands LN are arranged at a track pitch in the range of 0.71 µm to 0.77 µm. As shown in FIG. 2, the guide groove 152 meanders with a wobble cycle WS and a wobble width a. The frequency of the guide groove 152 is determined by the wobble cycle WS. The wobble cycle WS is set such that the frequency (hereinafter, referred to as a wobble frequency) of the wobble is 140.6 kHz in the general DVD-R. The amplitude a of the wobble is in the range of 20 nm to 35 nm in the DVD-R. In addition, a land pre-pit LPP is formed in the land LN.

Figure 3:
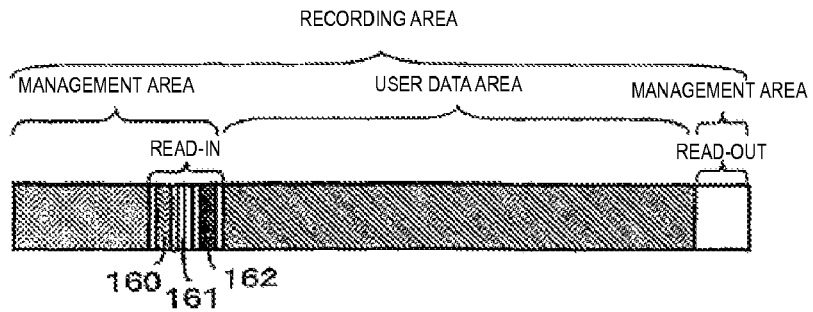
FIG. 3 is a diagram schematically illustrating the format of a recording area.

The recording layer 153 formed on the guide grooves 152 and the optical reflection layer 154 formed on the recording layer 153 form a recording area. Information is recorded in the recording area by forming pits in the recording layer 153 with laser light. The recording area has the format shown in FIG. 3. That is, the recording area is divided into a user data area that is interposed between a read-in area disposed on the inner circumferential side and a read-out area disposed on the outer circumferential side and a non-user area including the read-in area and the read-out area. For example, music data or image data is recorded in the user data area. A management area is a recording information management area, such as a PCA (Power Calibration Area) or an RMA (Recording Management Area) disposed on the inner circumferential side of the read-in area, other than the read-in area and the read-out area, the wobbles, or the land pre-pits. BD-R is different from the DVD-R in the detailed arrangement of the management area, for example, in that an OPC (Optimum Power Control) area corresponding to the RMA of the DVD-R is included in the read-in area, but the format is substantially similar to that of the DVD-R in that the user data area is interposed between the read-in area and the read-out area.

The management area of the optical disc 150 according to the invention includes a recording format management area 160 having information for determining the format of the optical disc 150, a recording condition management area 161 having information for controlling the recording conditions of the optical disc 150, and an authentication identification area 162 having information for determining whether the optical disc 150 is authenticated by a third party. Next, each of the areas will be described.

The recording format management area 160 is an area having, for example, pre-format information, such as positional information including an address. This area is allocated by, for example, the land pre-pit LPP or the wobble of the guide groove 152 in the read-in area.

The wobble of the guide groove 152 is for forming a reference signal for controlling a spindle motor that rotates the disc. The land pre-pit LPP is for detecting, for example, address information for recording or other disc information. Therefore, the signal that is specified on the basis of the land pre-pit LPP and the wobble of the guide groove 152 can be read to a recording device. The land pre-pit LPP and the wobble of the guide groove 152 are carved in the substrate 151. Therefore, even though all of the data written in the recording area is copied, the land pre-pit LPP and the wobble of the guide groove 152 are not copied.

The following copyright protection method can be performed using the above-mentioned characteristics of the land pre-pit LPP and the wobble of the guide groove 152. As the copyright protection method, there is a method in which dedicated software or only a recording device into which dedicated software is incorporated can record data. In the method, a general-purpose recording device cannot recognize a recordable optical disc, but dedicated software or a recording device into which dedicated software is incorporated can recognize a recordable optical disc.

As the method in which dedicated software or only a recording device into which dedicated software is incorporated can record data, for example, there is a method which changes the wobble cycle WS of the guide groove 152 to change the wobble frequency. In the general DVD-R, as described above, the wobble cycle WS is set such that the wobble frequency is 140.6 kHz at a standard linear velocity. The general-purpose recording device recognizes the optical disc with the wobble frequency as a recordable optical disc. However, when the wobble frequency is changed, the general-purpose recording device does not recognize the optical disc as a recordable optical disc. When the dedicated recording device is configured so as to recognize the optical disc with a changed wobble frequency as a recordable optical disc using the above-mentioned characteristics, dedicated software or only a recording device into which dedicated software is incorporated can record data.

As such, the code carved in the disc, such as the land pre-pit LPP or the wobble of the guide groove 152, may be used as a key to copyright protection. In this case, it is possible to prevent data copying.

The recording condition management area 161 is, for example, a manufacturer ID (MID). The MID is recorded in a pre-write area (not shown) that is provided in the read-in area in the recording area of the optical disc, or the land pre-pit.

The MID identifies the manufacturer of the optical disc. For example, the recording conditions of the optical disc, such as a laser light output and a pulse, are optimized by the recording conditions that have been registered in advance on the basis of the MID or an evaluation standard that is set on the basis of the MID. The recording conditions vary depending on optical conditions, such as the characteristics or the refractive index of a pigment used in the recording layer. When the optical disc is legitimate, a good recording quality is obtained since the MID is identical to the optimal recording conditions of the optical disc.

As such, the MID may be information indicating the quality of the optical disc. Therefore, it is possible to obtain information indicating the quality by reading the signal specified by the MID. In addition, the recording conditions corresponding to the MID, that is, a recording strategy may be information indicating the quality. For example, a lot number as well as the MID may be used as the information indicating quality. Since the lot number is given to one lot of the optical disc, it is possible to specify the disc. It is more preferable to use both the MID and the lot number.

It is preferable that information be provided in different formats in the recording format management area 160 of the optical disc 150 and the recording condition management area 161 of the optical disc 150. When information is recorded in one of the two areas in a format which is less likely to be copied, such as a wobble, a land pre-pit, or a bar code, it is possible to prevent all keys to copyright protection from being copied even though all of the data recorded in the recording area by the pit arrangement is copied.

The authentication identification area 162 has information for identifying authentication issued by the export source of data to be recorded. The information for identifying specific authentication is written by, for example, a method which records the information in advance during the manufacture of the disc, a method which reads the information from a server of the export source through a communication line, such as the Internet, and writes the information in the area of the disc, or a method which reads the information from an external storage, such as a CD-ROM, provided by the export source and writes the information.

When the information for identifying specific authentication is read from the outside, for example, the following method is used: when the user inputs an ID and a password, authentication is performed on the basis of the ID and the password, and data transmitted from the server of the export source is read. In addition, there is a method which reads a signal that is created by a program provided by the export source as the information for identifying specific authentication.

Plural kinds of information items identifying specific authentication may be written. For example, information that has been written in advance by the wobble or the land pre-pit, information read from the outside, and information created on the basis of the information that has been written in advance may be written at the same time. In addition, whenever the information recorded in the user data area is reproduced, information indicating that different authentications have been received may be written. As a result, a plurality of information items may be written.

The information for identifying specific authentication may be written in the same area as the recording condition management area 161 or in the recording condition management area 161. In this case, the information written in the recording condition management area may be used as the information for identifying specific authentication, or one of the information items for identifying a plurality of specific authentications may be used as information for controlling the recording conditions of laser light during recording.

Figure 4:
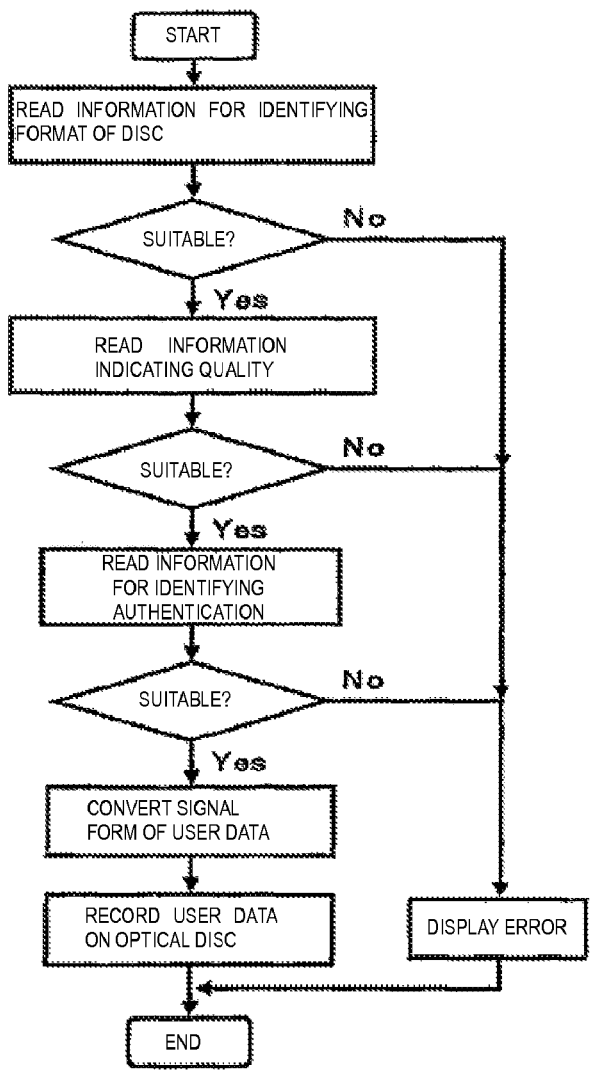
FIG. 4 is a flowchart illustrating a recording method according to the invention.

Next, a method of recording information on an optical information recording medium according to an embodiment of the invention will be described. FIG. 4 is a flowchart illustrating an example of the information recording method according to the invention. The information recording method according to the invention includes: a first step of determining whether information in the recording format management area of the optical disc 150 is suitable to be read by the recording device; a second step of determining whether quality identification information in the recording condition management area 161 of the optical disc 150 is suitable to be read by the recording device; a third step of determining whether specific authentication identification information in the authentication identification area 162 of the optical disc 150 is suitable to be read by the recording device; a fourth step of converting the signal form of user data, that is, encoding user data when it is determined in the third step that the specific authentication identification information is suitable; a fifth step of recording the user data whose signal form is converted in the user data area of the optical disc; and a sixth step of displaying an error message and notifying that recording is not available when it is determined that the information is not suitable in any one of the first step, the second step, and the third step. The recording device according to the invention is also operated on the basis of the flowchart.

In the first step, a signal for identifying the format of the optical disc 150 is read from the recording format management area 160. When the read information is identical to the authenticated information, the process proceeds to the second step. When the read information is not identical to the authenticated information, the process proceeds to the sixth step.

In the second step, information for identifying the quality of the optical disc 150 is read from the recording condition management area 161. The recording condition management area 161 is scanned and the information is read to the recording device. When the read information is identical to the authenticated information, the process proceeds to the third step. When the read information is not identical to the authenticated information, the process proceeds to the sixth step.

In the third step, the information for identifying specific authentication is read from the authentication identification area 162. When the information for identifying specific authentication has been recorded in advance during the manufacture of the disc, the authentication identification area 162 is scanned and the information is read to the recording device. When the information is read from the outside, the information is read through the Internet or an external storage. When the read information is identical to the authenticated information, the process proceeds to the fourth step. When the read information is not identical to the authenticated information, the process proceeds to the sixth step.

In the fourth step, the signal form of the user data is converted, that is, the user data is encoded. The signal form is converted, that is, the user data is encoded on the basis of any one of the information in the recording format management area 160, the information in the recording condition management area 161, and the information in the authentication identification area 162. In this case, two or more kinds of codes may be combined with each other, and encoding may be performed on the basis of the combination of the codes. It is preferable that at least one kind of code among the codes to be combined be other than the code recorded by the pit arrangement that is formed by laser light, such as a wobble, a land pre-pit, or a bar code.

In the fifth step, the user data whose signal form is converted is recorded in the user data area of the optical disc. The recorded user data is authenticated and cannot be read even though it is copied to other optical discs. In this way, when the recording of data capable of obtaining an optical disc having user data whose copyright is protected is completed, a series of processes end.

The optical disc on which data is recorded through the above-mentioned steps can be reproduced by a dedicated reproducing device or a reproducing device into which dedicated software for decoding an encryption key can be incorporated. The recording method according to the invention may be combined with a CPRM (Content Protection for Recordable Media) which is widely known as a copyright management method. The method proposed in the invention is not limited to copyright protection, but can be applied to other data management methods.

In the above-described embodiment, the DVD-R is given as an example. However, the invention is not limited thereto, but the invention can be applied to write-once type optical information recording media, such as a DVD+R, an HD DVD-R, or a BD-R, and rewritable optical information recording media. In the above-described embodiment, the information for identifying the format of the optical information recording medium, the information for identifying the quality of the optical information recording medium, or the information for identifying specific authentication is written by a bar code or pit arrangement formed by laser light other than the wobble or the land pre-pit, but the invention is not limited thereto. For example, a portion of the wobble cycle may be changed, or embossed pits may be formed on the substrate in advance. The recording methods may be appropriately combined with each other. In addition, when the method of recording information on the optical information recording medium includes the above-mentioned steps, the identification order may be appropriately changed, and the steps may be combined with each other to obtain encoded information.

The invention claimed is:

1. An optical information recording medium comprising:
a user data area in which a user can record user data; and
a management area which has information required to control a recording signal when data is recorded in the user data area,
wherein the user data is recorded by laser light, and
the management area includes:
a recording format management area that has information for allowing an optical information recording device to perform an operation of determining the format of the data recorded in the user data area, converting the format into a predetermined signal form according to the determination result, and recording the data;
a recording condition management area that has information for allowing the optical information recording device to control the recording conditions of the laser light when data is recorded in the user data area; and
an authentication identification area that has information for allowing the optical information recording device to perform an operation of determining whether the optical information recording medium is authenticated by a third party,
wherein the information for performing the operation which is included in the recording format management area, the information for controlling the recording conditions which is included in the recording condition management area, and the information for performing the determining operation which is included in the authentication identification area are recorded in forms selected from the group consisting of pit arrangement, a wobble provided in a guide grove, a land pre-pit, and a bar code, and at least one of the form of the information for performing the operation, the form of the information for controlling the recording conditions, or the form of the information for performing the determining operation is different from the other form(s) so that even when all of the data written in the recording area is copied to a different optical information medium, the data can be inhibited from being read from the different optical information recording medium.

2. The optical information recording medium according to claim 1,
wherein the authentication identification area has information indicating plural kinds of authentications.

3. The optical information recording medium according to claim 1,
wherein the information in the authentication identification area is for allowing the optical information recording device to perform an operation of recording data in the user data area according to the result determined in the authentication identification area with only predetermined software.

4. The optical information recording medium according to claim 1,
wherein the information in the recording condition management area is information indicating a manufacturer and/or information indicating a recording strategy.

5. The optical information recording medium according to claim 1,
wherein the information for performing the operation which is included in the recording format management area is pit arrangement, a wobble provided in a guide groove, or a land pre-pit.

6. The optical information recording medium according to claim 1,
wherein the information for controlling the recording conditions which is included in the recording condition management area or the information for performing the determining operation which is included in the authentication identification area is pit arrangement.

7. The optical information recording medium according to claim 1,
wherein the authentication identification area is provided in the same area as the recording condition management area or in the recording condition management area, and the same signal is used to manage the recording conditions and identify authentication.

8. The optical information recording medium according to claim 1,
wherein the format managed in the recording format management area is a DVD format.

9. The optical information recording medium according to claim 1,
wherein the conversion to the predetermined signal form managed in the recording format management area is conversion to a signal form for copyright protection.

10. A method of recording predetermined information in a user data area with laser light on an optical information recording medium including the user data area in which user data can be recorded and a management area which has information required to control recording conditions when data is recorded in the user data area, comprising:
reading information in a recording format management area that is provided in the management area and determining the format of the data when the data is recorded in the user data area;
reading and collating information in a recording condition management information area and/or information in an authentication identification area; and
converting the user data into a predetermined signal form according to the collation result and recording the user data in the user data area of the optical information recording medium,
wherein the information in the recording format management area, the information in the recording condition management information area, and the information in the authentication identification area are recorded in forms selected from the group consisting of pit arrangement, a wobble provided in a guide grove, a land pre-pit, and a bar code, and at least one of the form of the information in the recording format management area, the form of the information in the recording condition management information area, or the form of the information in the authentication identification area is different from the other form(s) so that even when all of the data written in the recording area is copied to a different optical information medium, the data can be inhibited from being read from the different optical information recording medium.

11. The method of recording data on an optical information recording medium according to claim 10,
wherein the recording conditions are controlled on the basis of the information in the recording condition management information area when information is recorded in the user data area.

12. The method of recording data on an optical information recording medium according to claim 10,
wherein an operation of recording the data in the user data area is performed only by predetermined software according to the result determined by the information in the authentication identification area.

13. The method of recording data on an optical information recording medium according to claim 10,
wherein the format is a DVD format.

14. The method of recording data on an optical information recording medium according to claim 10,
wherein the conversion to the predetermined signal form performed according to the collation result is conversion to a signal form for copyright protection.

15. An optical information recording device for recording predetermined information in a user data area with laser light in an optical information recording medium including the user data area in which user data can be recorded and a management area which has information required to control recording conditions when data is recorded in the user data area,
wherein the optical information recording device reads information in a format management area that is provided in the management area and determines the format of the data when the data is recorded in the user data area,
the optical information recording device reads and collates information in a recording condition management information area and/or information in an authentication identification area, and
the optical information recording device converts the user data into a predetermined signal form according to the collation result and records the user data in the user data area of the optical information recording medium,
wherein the information in the recording format management area, the information in the recording condition management information area, and the information in the authentication identification area are recorded in forms selected from the group consisting of pit arrangement, a wobble provided in a guide grove, a land pre-pit, and a bar code, and at least one of the form of the information in the recording format management area, the form of the information in the recording condition management information area, or the form of the information in the authentication identification area is different from the other form(s) so that even when all of the data written in the recording area is copied to a different optical information medium, the data can be inhibited from being read from the different optical information recording medium.

16. The optical information recording device according to claim 15,
wherein the recording conditions are controlled on the basis of the information in the recording condition management information area when information is recorded in the user data area.

17. The optical information recording device according to claim 15,
wherein an operation of recording data in the user data area is performed only by predetermined software according to the result determined by the information in the authentication identification area.

18. The optical information recording device according to claim 15,
wherein the format is a DVD format.

19. The optical information recording device according to claim 15,
wherein the conversion to the predetermined signal form performed according to the collation result is a conversion to a signal form for copyright protection.

* * * * *